United States Patent
Croak et al.

(10) Patent No.: US 7,602,900 B1
(45) Date of Patent: Oct. 13, 2009

(54) METHOD AND APPARATUS FOR PROVIDING RELEVANT DATA RESPONSIVE TO A PROBLEM REQUEST

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 1041 days.

(21) Appl. No.: 11/022,437

(22) Filed: Dec. 23, 2004

(51) Int. Cl.
*H04M 3/50* (2006.01)
*H04M 1/654* (2006.01)
*H04M 3/523* (2006.01)

(52) U.S. Cl. .............................. 379/265.07; 379/88.01
(58) Field of Classification Search ............. 379/88.01, 379/88.02, 265.07
See application file for complete search history.

(56) References Cited

U.S. PATENT DOCUMENTS

| 6,600,821 | B1* | 7/2003 | Chan et al. | 379/265.07 |
| 6,853,722 | B2* | 2/2005 | Joseph et al. | 379/265.07 |
| 7,127,058 | B2* | 10/2006 | O'Connor et al. | 379/265.01 |
| 7,457,404 | B1* | 11/2008 | Hession et al. | 379/265.07 |

\* cited by examiner

*Primary Examiner*—Harry S Hong

(57) ABSTRACT

A method and system for providing relevant data responsive to a customer event is described. In one example, a description relating to the customer event is received. The description is then monitored in order to detect at least one keyword. Lastly, at least one information block containing data relevant to a customer event associated with the keyword is provided in response to the description includes that keyword.

14 Claims, 3 Drawing Sheets

METHOD AND APPARATUS FOR PROVIDING RELEVANT DATA RESPONSIVE TO A PROBLEM REQUEST

BACKGROUND OF THE INVENTION

1. Field of the Invention

Embodiments of the present invention generally relate to communication networks and, more particularly, to a method and apparatus for providing relevant data responsive to a problem request.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet-switched networks and circuit-switched networks. Exemplary packet-switched networks include internet protocol (IP) networks, asynchronous transfer mode (ATM) networks, frame-relay networks, and the like. An exemplary circuit-switched network includes a plain old telephone system (POTS), such as the publicly switched telephone network (PSTN). Although circuit-switched networks have traditionally been used to provide an effective means for voice communication, packet-switched networks are currently being utilized on a more frequent basis. Another example of packet-switched networks is a Voice over Internet Telephony (VoIP) network.

Customer care agents (e.g., Tier 1 agents) supporting communication networks such as these must often resolve complex service problems based on a limited amount of information in a short period of time. These network service problems may involve a variety of concerns, including premise equipment, network component problems, access links, and service features. Normally, customer care agents must quickly determine if they are capable of solving the issue or if the problem needs to be referred to other work centers. The sooner a customer care agent can resolve the problem, the smaller the operational costs for the service will be.

SUMMARY OF THE INVENTION

In one embodiment, a method and system for providing relevant data responsive to a customer event is described. More specifically, a description relating to a customer event (e.g., a problem or complaint) is compared with keywords stored in a database. In one embodiment, information blocks containing relevant data associated with the keywords are provided to a customer care agent in the event the description contains one of the keywords. A determination is subsequently made as to whether or not the customer event has been resolved. In the event the customer event has been resolved, the description and an associated solution are stored in the database. In one embodiment, keywords are associated with the stored description and solution.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
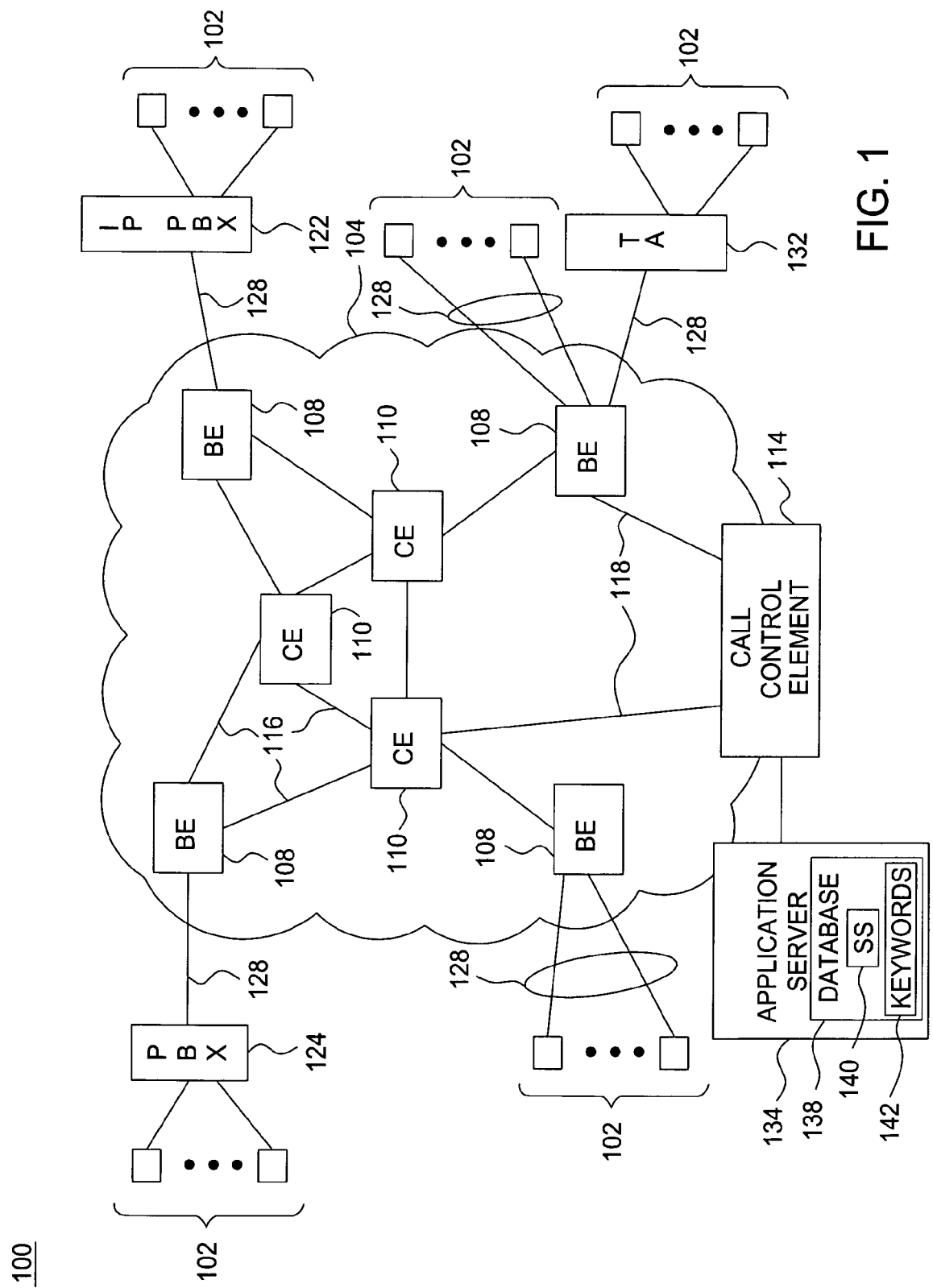
FIG. 1 is a block diagram depicting an exemplary embodiment of a communication system in accordance with the invention.

FIG. 1 depicts an exemplary embodiment of a communication system 100 in accordance with the invention. The communication system 100 comprises a plurality of endpoint devices 102 and a packet-switched network 104. The packet-switched network 104 illustratively comprises a plurality of border elements (BEs) 108, a plurality of core elements (CEs) 110, and a call control element (CCE) 114. The border elements 106 and the core elements 108 communicate via core communication links 116. The call control element 114 may be coupled to one or more of the core elements 110 or border elements 108 through communication link(s) 118. The packet-switched network 104 may comprise one or more of an internet protocol (IP) network, asynchronous transfer mode (ATM) network, frame relay network, and like type packet networks known in the art. For example, the packet-switched network 104 may comprise a voice-over-IP (VOIP) network.

A core element is a network element (such as a router, switch, cross-connect system, server, and the like) that facilitates control and communication between the border elements 106. A border element is a network element (such as a router, switch, cross-connect system, server, and the like) through which the endpoint devices 102 connect to the packet-switched network 104. A border element typically performs functions such as routing, switching, security, admission control, and the like. In one embodiment, a border element translates access protocols into Session Initiation Protocol (SIP), which is then used to facilitate communication within a service provider IP infrastructure.

For purposes of clarity by example, only three core elements 110 are depicted in FIG. 1. It is to be understood that the packet-switched network 104 may include fewer or more core elements 110. Similarly, although four border elements 108 are depicted in FIG. 1 by example, the packet-switched network 104 may include fewer or more border elements. Although the border elements 108 are depicted as being directly connected to the core elements 110, other intervening equipment (not shown) may be deployed.

The call control element (CCE) 114 resides within the VoIP infrastructure and is connected to the BEs using the Session Initiation Protocol (SIP) over the underlying packet-switched network 104. The CCE 114 is typically implemented as a Media Gateway Controller and performs network wide call control related functions as well as interacts with the appropriate VoIP service related servers when necessary. The CCE 114 functions as a SIP back-to-back user agent and is a signaling endpoint for all call legs between all BEs 108 and the CCE 114. The CCE 114 may need to interact with various VoIP related servers in order to complete a call that require certain service specific features, e.g. translation of an E.164 voice network address into an IP address. For purposes of clarity by example, the packet-switched network 104 is shown with one CCE 114. It is to be understood, however, that the packet-switched network 104 may include a plurality of call control elements, each configured to control various border elements, servers, and the like.

The application server 134 is coupled to the packet-switched network 104 via a connection to the call control element 114. The application server 134 may be any type of computer or device that stores data, manages network resources, and performs other conventional computing functions. Depending on the particular embodiment, there may be one or more application servers coupled to one or more call control elements 114. Similarly, although the application server 134 is shown to be coupled to the network 104, the server (or plurality of servers) may only be connected to the network via the call control element (or plurality of CCEs) in another embodiment.

The application server 134 may also contain a database 138. The database 138 may be an electronic filing system or any collection of information organized in such a way that the server 134 can quickly select desired pieces of data. In one embodiment, the database 138 contains "solved scenarios" 140 and plurality of associated keywords 142 (see descriptions below).

An endpoint device 102 is typically a user terminal (such as a telephone, a computer, and the like) by which one or more users communicate with other users in the communication system 100. Some of the endpoint devices 102 communicate with the border elements 108 via edge communication links 128. An endpoint device (such as a time division multiplexing (TDM) phone, an IP phone, an Integrated Services Digital Network (ISDN) phone, a computer, and the like) is able to establish a connection with a border element through the communication links 128. Some of the endpoint devices 102 are capable of being turned off and on or otherwise capable of toggling between an active state in which calls may be received and an inactive state in which calls cannot be received.

In one embodiment, an endpoint device connects to the packet-switched network 104 through a circuit-switched connection with a border element. In another embodiment, an endpoint device connects to the network 104 through an IP connection with a border element. In other embodiments, an endpoint device may connect to a border element via a Signaling System 7 (SS7) connection, a Digital Subscriber Line (DSL) connection, a cable television connection, a customer managed router connection, a customer managed gateway connection, a local area network connection, a frame relay (FR) connection, an asynchronous transfer mode (ATM) connection, and like access technologies as known in the art. Those skilled in the art will appreciate that numerous other techniques for establishing a connection between an endpoint device and a border element exist in the art.

Some of the endpoint devices 102 (e.g., TDM phones) connect to a border element through an edge communication link via a TDM Private Branch Exchange (PBX) 124. Other endpoint devices 102 (e.g., an IP phone) connect to a border element through an edge communication link via an IP Private Branch Exchange (IP-PBX) 122. Still others of the endpoint devices 102 (e.g., computer) connect to a border element through an edge communication link directly. Other endpoint devices 102 (e.g., ISDN phone) connect to a border element through an edge communication link via a terminal adapter (TA) 132.

Figure 2:
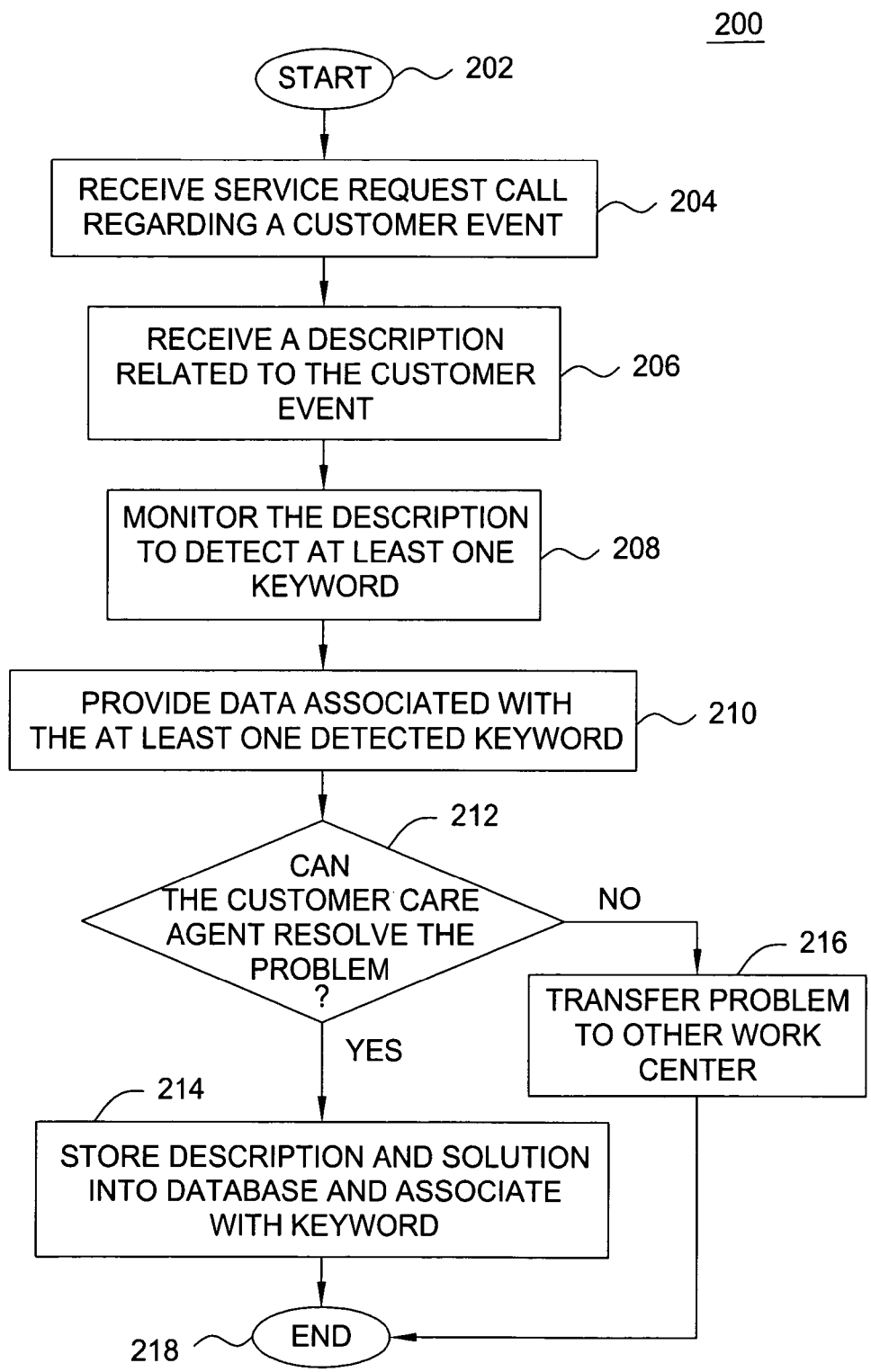
FIG. 2 is a flow diagram depicting an exemplary embodiment of a method for providing relevant data responsive to a problem request in accordance with the invention.

FIG. 2 is a flow diagram depicting an exemplary embodiment of a method 200 method for providing relevant data responsive to a problem request in accordance with the invention. Aspects of the method 200 may be understood with reference to the communication system 100 of FIG. 1.

The method 200 begins at step 202. At step 204, a service request call is received. In one embodiment, the service request call is received by a Tier 1 customer care agent. The service request call may pertain to any type of network problem (i.e., a "customer event"). These network problems may involve a variety of concerns, including premise equipment, network components, access links, and service features. At step 206, a description relating to the customer event is received. In one embodiment, a server obtains entered text pertaining to the problem associated with the service request call. More specifically, a customer discloses the particular problem encountered to the customer care agent, who subsequently inputs the information (e.g., relevant text) using a workstation to describe the problem. For example, the description of the problem (i.e., a "customer event") is logged into a "trouble ticket." A completed trouble ticket is an electronic form that contains the description of the calling customer's problem and is ultimately submitted to a trouble ticketing center as well as to an expert knowledge database (e.g., application server database 138) via the VoIP network 104. In one embodiment, the application server obtains or has access to the description entered into the trouble tickets.

The method 200 continues to step 208 where the description is monitored to detect at least one key word. In one embodiment, the server evaluates the description to determine if at least one match between the entered text (i.e., description) and a plurality of keywords 142 is made. In one embodiment, the words entered into the customer care agent's trouble ticket (i.e., description of customer care agent's problem) are examined and compared with a keyword from a database storing a plurality of keywords 142. In another embodiment, the application server 134 instead examines the database file in search of words that are found in the trouble ticket description on a word by word basis.

At step 210, data associated with the detected or matched keyword(s) is provided. In one embodiment, relevant data or information associated with the matched keyword is provided to the customer care agent. The information can then be used by customer care agents to act as a guide for responding to customer problems. In one embodiment, this information is comprised of the description data and a corresponding solution(s), i.e., "solved scenarios" 140 and is associated with the keywords 142 similarly stored in the database 138. The data entered into the database originates from various sources, including, but not limited to 1) previously resolved customer scenarios sharing similar characteristics (i.e., same component, service, etc.), 2) expert advice from vendors, which may include vendor guidelines for troubleshooting, 3) established work center practices and guidelines, 4) expert advice and instructions from subject matter experts (SMEs), and the like.

Furthermore, the data associated with the keyword may be supplied to the customer care agent in several different manners. In one embodiment, the data is presented to the customer care agent in the form of a "pop-up" information block or window. This information block may be displayed on any type of screen that is known in the art such as, but not limited to, a television screen, a computer monitor, a personal digital assistant (PDA), and the like. In one embodiment, the information block may comprise troubleshooting tips and/or expert advice. In another embodiment, the information block may provide (and prompt) the customer care agent with certain strategic questions in order to obtain more relevant information from the calling customer.

At step 212, a determination of whether the problem can be resolved is made. In one embodiment, the customer care agent handling the service request call must make a decision as to whether or not the problem can be solved by the agent in light of the data provided by the information blocks. If it is determined that the problem cannot be immediately resolved, the method 200 continues to step 214. Otherwise, the method 200 proceeds to step 216, where the service request call and problem are transferred to another work center or customer care agent. After the call is transferred, the method 200 continues to step 218 and ends.

At step 214, the service request call is resolved and the description relating to the problem and the corresponding solutions are stored in the database and subsequently associated with keywords. In one embodiment, the customer care agent successfully resolves the problem associated with the service request call and the text previously entered into the resolved trouble ticket, along with the solution (or solutions), is stored in the database, i.e., the knowledge database may effectively "grow" in this manner. In another embodiment, a service request call related to a unique problem (i.e., one that has yet been encountered) is resolved and the description relating to the problem and the corresponding solutions are stored in the database and are subsequently associated with new keywords.

In one embodiment, only a summary of the description and associated solutions are stored in the database for future reference. In another embodiment, confirmation from the customer that the problem has been resolved is required as a safeguard so that the integrity of the database is maintained. Specifically, if "speculated" solutions are entered into the database without the customer's confirmation of success, the accuracy of the data stored in the database (i.e., the data to be provided by the information blocks) may be compromised.

Figure 3:
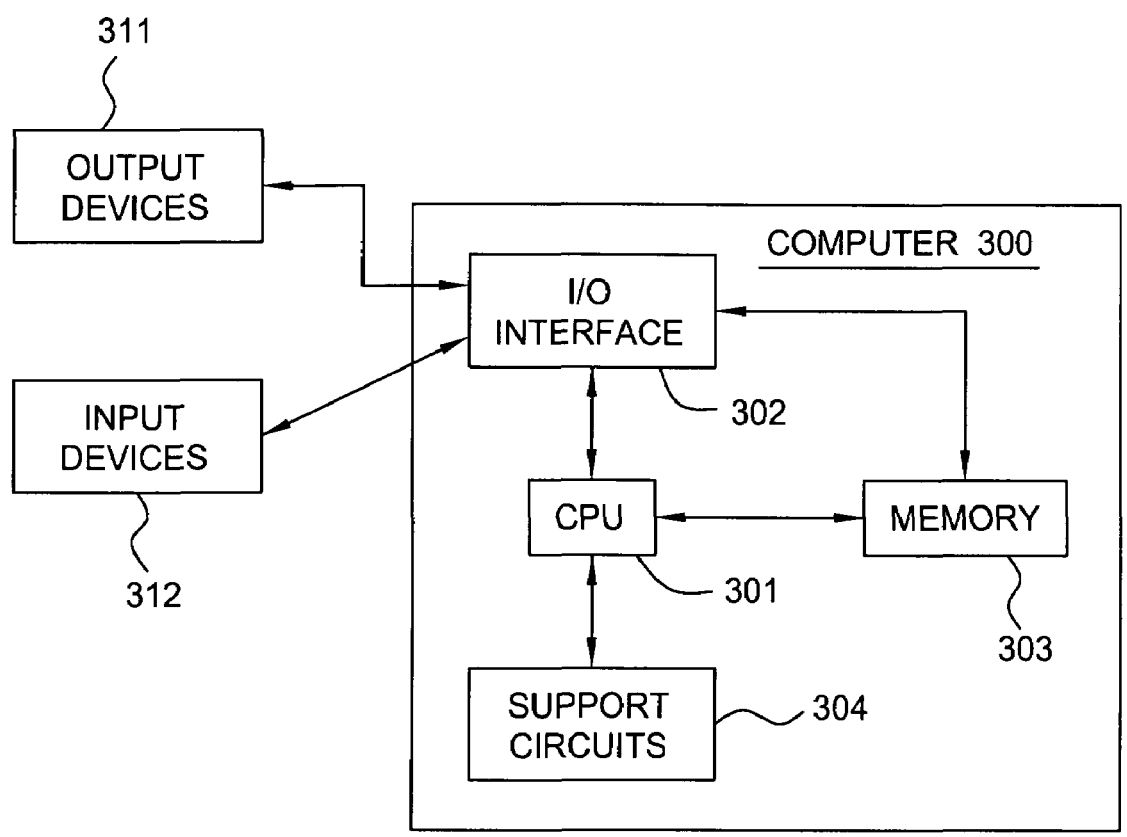
FIG. 3 is a block diagram depicting an exemplary embodiment of a computer suitable for implementing the processes and methods described herein.

FIG. 3 is a block diagram depicting an exemplary embodiment of a computer 300 suitable for implementing the processes and methods described herein. For example, the computer 300 may be used to implement the call control element 112, border elements 108, and core elements 110 of FIG. 1. The computer 300 includes a central processing unit (CPU) 301, a memory 303, various support circuits 304, and an I/O interface 302. The CPU 301 may be any type of microprocessor known in the art. The support circuits 304 for the CPU 301 include conventional cache, power supplies, clock circuits, data registers, I/O interfaces, and the like. The I/O interface 302 may be directly coupled to the memory 303 or coupled through the CPU 301. The I/O interface 302 may be coupled to various input devices 312 and output devices 311, such as a conventional keyboard, mouse, printer, display, and the like.

The memory 303 may store all or portions of one or more programs and/or data to implement the processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 300 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method for providing relevant data responsive to a customer event in a packet-switched network, comprising:
    receiving by an application server a description relating to said customer event;
    monitoring by said application server said description to detect at least one keyword;
    providing by said application server at least one information block containing said relevant data associated with said at least one keyword if said description includes said at least one keyword; and
    storing by said application server both of said description and at least one associated solution in response to said customer event being resolved, wherein said storing comprises receiving from a customer associated with said customer event a confirmation of said customer event being resolved prior to storing said both of said description and said at least one associated solution.

2. The method of claim 1, further comprising generating at least one new keyword for said both of said description and said at least one associated solution.

3. The method of claim 1, further comprising associating said at least one keyword with said both of said description and said at least one associated solution.

4. The method of claim 1, wherein said relevant data is based on expert knowledge data originating from at least one of: previously resolved customer situations sharing similar characteristics, expert advice from vendors, established work center practices and guidelines, and expert advice and instructions from subject matter experts.

5. The method of claim 1, wherein said at least one information block contains at least one of: troubleshooting tips, expert advice, and strategic questions.

6. The method of claim 1, wherein said packet-switched network is a voice over internet protocol (VoIP) network.

7. A computer readable storage medium having stored thereon instruction that, when executed by a processor, cause the processor to perform a method for providing relevant data responsive to a customer event in a packet-switched network, comprising:
    receiving a description relating to said customer event;
    monitoring said description to detect at least one keyword;

providing at least one information block containing said relevant data associated with said at least one keyword if said description includes said at least one keyword; and storing both of said description and at least one associated solution in response to said customer event being resolved, wherein said storing comprises receiving from a customer associated with said customer event a confirmation of said customer event being resolved prior to storing said both of said description and said at least one associated solution.

8. The computer readable storage medium of claim 7, further comprising generating at least one new keyword for said both of said description and said at least one associated solution.

9. The computer readable storage medium of claim 7, further comprising associating said at least one keyword with said both of said description and said at least one associated solution.

10. The computer readable storage medium of claim 7, wherein said relevant data is based on expert knowledge data originating from at least one of: previously resolved customer situations sharing similar characteristics, expert advice from vendors, established work center practices and guidelines, and expert advice and instructions from subject matter experts.

11. The computer readable storage medium of claim 7, wherein said at least one information block contains at least one of: troubleshooting tips, expert advice, and strategic questions.

12. The computer readable storage medium of claim 7, wherein said packet-switched network is a voice over internet protocol (VoIP) network.

13. A system for providing relevant data responsive to a customer event in a packet-switched network, comprising:

means for receiving a description relating to said customer event;

means for monitoring said description to detect at least one keyword;

means for providing at least one information block containing said relevant data associated with said at least one keyword if said description includes said at least one keyword; and means for storing both of said description and at least one associated solution in response to said customer event being resolved, wherein said means for storing comprises means for receiving from a customer associated with said customer event a confirmation of said customer event being resolved prior to storing said both of said description and said at least one associated solution.

14. The system of claim 13, wherein said packet-switched network is a voice over internet protocol (VoIP) network.

* * * * *